United States Patent
Herkommer et al.

(10) Patent No.: US 10,138,995 B2
(45) Date of Patent: Nov. 27, 2018

(54) FLUID ARRANGEMENT

(71) Applicant: SCHAEFFLER TECHNOLOGIES AG & CO. KG, Herogenaurach (DE)

(72) Inventors: Dominik Herkommer, Schriesheim (DE); Loyal George MacMillian, Karlsruhe (DE); Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 297 days.

(21) Appl. No.: 15/035,172

(22) PCT Filed: Oct. 13, 2014

(86) PCT No.: PCT/DE2014/200545
§ 371 (c)(1),
(2) Date: May 6, 2016

(87) PCT Pub. No.: WO2015/067259
PCT Pub. Date: May 14, 2015

(65) Prior Publication Data
US 2016/0290482 A1   Oct. 6, 2016

(30) Foreign Application Priority Data

Nov. 8, 2013 (DE) .................. 10 2013 222 752

(51) Int. Cl.
*F16H 57/04* (2010.01)
*F16D 25/10* (2006.01)
(Continued)

(52) U.S. Cl.
CPC .......... *F16H 57/0446* (2013.01); *F15B 1/02* (2013.01); *F15B 1/027* (2013.01); *F16D 25/10* (2013.01);
(Continued)

(58) Field of Classification Search
None
See application file for complete search history.

(56) References Cited

U.S. PATENT DOCUMENTS

| | | | |
|---|---|---|---|
| 2003/0047410 A1* | 3/2003 | Busold | F16D 25/14 192/103 F |
| 2009/0321209 A1 | 12/2009 | Grethel et al. | |
| 2011/0146820 A1* | 6/2011 | Frerichs | F15B 1/027 137/565.11 |
| 2012/0060488 A1* | 3/2012 | Grethel | F15B 21/042 60/484 |

(Continued)

FOREIGN PATENT DOCUMENTS

| | | |
|---|---|---|
| CN | 101627213 A | 1/2010 |
| CN | 102575755 A | 7/2012 |

(Continued)

OTHER PUBLICATIONS

EP1236918 translation.*

Primary Examiner — Jacob S. Scott
Assistant Examiner — Timothy Hannon
(74) Attorney, Agent, or Firm — Kevin L. Parks

(57) ABSTRACT

A fluid arrangement including apparatus and a method for fluid actuation of at least one motor vehicle drive train component, such as a transmission or a clutch. The fluid arrangement has at least one fluid actuation system and a fluid energy source. The fluid energy source includes a fluid pump having a first fluid transport direction for actuating the motor vehicle component, and having a second fluid transport direction that is opposite the first fluid transport direction and in which second fluid transport direction the fluid pump provides a stream of fluid to cool the motor vehicle component.

17 Claims, 4 Drawing Sheets

(51) Int. Cl.
  *F15B 1/02* (2006.01)
  *F15B 1/027* (2006.01)
  *F16H 61/00* (2006.01)
  *F16D 48/02* (2006.01)
  *F16H 3/00* (2006.01)

(52) U.S. Cl.
  CPC ......... *F16D 25/14* (2013.01); *F16H 57/0436* (2013.01); *F16H 61/0025* (2013.01); *F16H 61/0031* (2013.01); *F16H 3/006* (2013.01); *F16H 2061/0034* (2013.01); *F16H 2061/0037* (2013.01)

(56) References Cited

U.S. PATENT DOCUMENTS

| | | | |
|---|---|---|---|
| 2012/0077632 A1* | 3/2012 | Babbitt | B60K 6/12 475/1 |
| 2012/0241281 A1 | 9/2012 | Franz et al. | |
| 2013/0310216 A1 | 11/2013 | Kamiya et al. | |
| 2014/0080666 A1 | 3/2014 | Rühle et al. | |

FOREIGN PATENT DOCUMENTS

| | | |
|---|---|---|
| DE | 10 2008 009 653 A1 | 9/2008 |
| DE | 10 2010 047 801 A1 | 5/2011 |
| DE | 10 2011 102 277 A1 | 11/2012 |
| DE | 10 2013 200 484 A1 | 7/2013 |
| EP | 1 126 918 A1 | 9/2002 |
| EP | 1236918 A1 | 9/2002 |
| JP | 2012 171372 A | 9/2012 |

* cited by examiner

FLUID ARRANGEMENT

CROSS-REFERENCE TO RELATED APPLICATION

This application is the U.S. national phase application under 35 U.S.C. § 371 of International Application Serial No. PCT/DE2014/200545, having an international filing date of 13 Oct. 2014, and designating the United States, which claims priority based upon German Patent Application No. DE 10 2013 222 752.3, filed on 8 Nov. 2013, the entire contents of each of which applications are hereby incorporated by reference herein to the same extent as if fully rewritten.

BACKGROUND OF THE INVENTION

Field of the Invention

The present invention relates to a fluid arrangement for fluid actuation of at least one motor vehicle component, in particular a transmission or clutch, having at least one fluid actuation system, and having a fluid energy source. In addition, the present invention relates to a method for fluid actuation of at least one motor vehicle component, such as a transmission or clutch, having such a fluid arrangement.

Description of the Related Art

From German published application DE 10 2008 009 653 A1 a hydraulic system for controlling a dual-clutch transmission of a motor vehicle is known, which includes: a hydraulic energy source to supply the hydraulic system with hydraulic energy by means of a hydraulic medium; a pressure accumulator to store the hydraulic energy; a clutch cooling system to cool clutches of the dual-clutch transmission by means of the hydraulic medium; clutch actuators to operate a first clutch and a second clutch; the hydraulic energy source includes a double-suction electric pump.

From German published application DE 10 2010 047 801 A1 a hydrostatic actuator is known, having a master cylinder which includes a housing and a piston which is axially movable in the housing, pressurizing a pressure chamber which is filled with a pressurizing agent, having a rolling planetary gear unit with a sleeve which converts a rotary propulsion to an axial motion, the rolling planetary gear unit being driven by an electric motor.

An object of the present invention is to simplify the actuation of at least one motor vehicle component, in particular a transmission or a clutch, having at least one fluid actuation system, and having a fluid energy source.

SUMMARY OF THE INVENTION

The object is fulfilled in the case of a fluid arrangement for fluid actuation of at least one motor vehicle component, in particular a transmission or a clutch, having at least one fluid actuation system and having a fluid energy source, by the fact that the fluid energy source includes a fluid pump having a first transport direction, and having a second transport direction opposite the first transport direction in which the fluid pump provides a stream of fluid to cool the motor vehicle component. The fluid arrangement is preferably a hydraulic system which is operated using a hydraulic medium, such as hydraulic oil. The motor vehicle component is preferably a transmission or a clutch. The fluid pump is preferably a positive displacement pump, for example a vane pump, a gear pump, or a reciprocating piston pump. The fluid pump is driven, for example, by an electric motor. In the first transport direction the fluid pump serves to actuate the clutch, for example engaging it. In the second transport direction, the fluid pump serves to cool the dual clutch. At the same time, the fluid pump can serve in the second transport direction to disengage the clutch.

In the case of a fluid arrangement for fluid actuation of at least two motor vehicle components, in particular two indexing transmissions or two indexing clutches, having two fluid actuating systems and having two fluid energy sources, the object stated above is fulfilled alternatively or additionally by the fact that the fluid energy source includes two fluid pumps, each having a first transport direction and a second transport direction opposite the first transport direction, in which the respective fluid pump provides a stream of fluid to cool at least one motor vehicle component, in particular one that is not operated or not actuated, or both motor vehicle components, in particular a dual clutch or a transmission.

Using the fluid arrangement according to the present invention, tight construction space in a motor vehicle can usually be utilized optimally. With the two fluid pumps, preferably designed as reversing pumps, both the fluid actuation and the cooling of at least one or two motor vehicle components is made possible in a simple way. In the first transport direction, the fluid pump serves to actuate the respective clutch, for example engaging it. In the second transport direction the fluid pump serves to cool the dual clutch. At the same time, the fluid pump can serve in the second transport direction to disengage the respective clutch. While the one fluid pump is operated in the first transport direction, the other fluid pump can be used advantageously in the second transport direction for cooling.

A preferred exemplary embodiment of the fluid arrangement is characterized in that the fluid pumps is/are each connected by means of a valve on the input side and output side to a fluid reservoir. The result is that in a simple manner pressure is built up in both transport directions, and fluid can be drawn along.

Another preferred exemplary embodiment of the fluid arrangement is characterized in that an auxiliary pump, in particular an ejector pump, is situated on a cooling side of the fluid pumps. The fluid pumps is/are designed for significantly greater pressures and flow volumes for actuating the at least one motor vehicle component than for cooling purposes. The auxiliary pump, preferably designed as an ejector pump, therefore serves to increase the flow volume and to lower the pressure provided by the fluid pumps.

Another preferred exemplary embodiment of the fluid arrangement is characterized in that a pressure accumulator and/or a prioritizing logic unit is situated on the cooling side of the fluid pumps. The pressure accumulator advantageously enables an unwanted undersupply of cooling medium to be bridged over. Such an undersupply can occur during overlapping shifts and other operating states. In order to drain or fill the pressure accumulator at the correct time, a prioritizing logic unit can be provided advantageously. The prioritizing logic unit can include an active or passive valve or a throttle.

Another preferred exemplary embodiment of the fluid arrangement is characterized in that a valve is connected between the auxiliary pump or the pressure accumulator and the fluid pump. This reliably prevents an unwanted return flow or drawing in of fluid from the cooling side of the fluid pump, in particular when the at least one motor vehicle component is actuated.

Another preferred exemplary embodiment of the fluid arrangement is characterized in that a valve is connected in each case between the auxiliary pump or the pressure accumulator and the respective fluid pump. In the design with two fluid pumps, that arrangement prevents in a simple manner fluid being transported from the one fluid pump to the other fluid pump in certain operating states without producing a stream of cooling fluid.

Another preferred exemplary embodiment of the fluid arrangement is characterized in that the valves are designed as check valves. By means of the check valves, the previously described functions can be realized cost-effectively in the fluid arrangement according to the present invention in a simple manner.

In a method for fluid actuation of at least one motor vehicle component, such as a transmission or a clutch, having a fluid arrangement as described previously, the object stated above is fulfilled alternatively or additionally by the fact that the fluid pump is used in the first transport direction to actuate the motor vehicle component, and in the second transport direction to cool the motor vehicle component. This provides the benefit that only a single fluid pump is needed to actuate and cool the motor vehicle components.

In a method for fluid actuation of at least two motor vehicle components, in particular two indexing transmissions or two indexing clutches, having a fluid arrangement as described previously, the object stated above is fulfilled alternatively or additionally by the fact that the fluid pumps are used in the first transport direction to actuate the assigned motor vehicle component, and in the second transport direction to cool the other in particular non-operated or non-actuated of the or of both motor vehicle components. One of the fluid pumps is assigned to each motor vehicle component. When the one motor vehicle component is actuated, the fluid pump assigned to the other motor vehicle component can be used for cooling, and vice versa. In a region of overlap, a stream of cooling medium can be kept nearly constant, for example, with the aid of the pressure accumulator.

BRIEF DESCRIPTION OF THE DRAWINGS

Additional advantages, features, and details of the present invention can be seen from the following description, in which various exemplary embodiments are described in detail with reference to the drawings. The drawing figures show the following.

DESCRIPTION OF THE PREFERRED EMBODIMENTS

Figure 1:
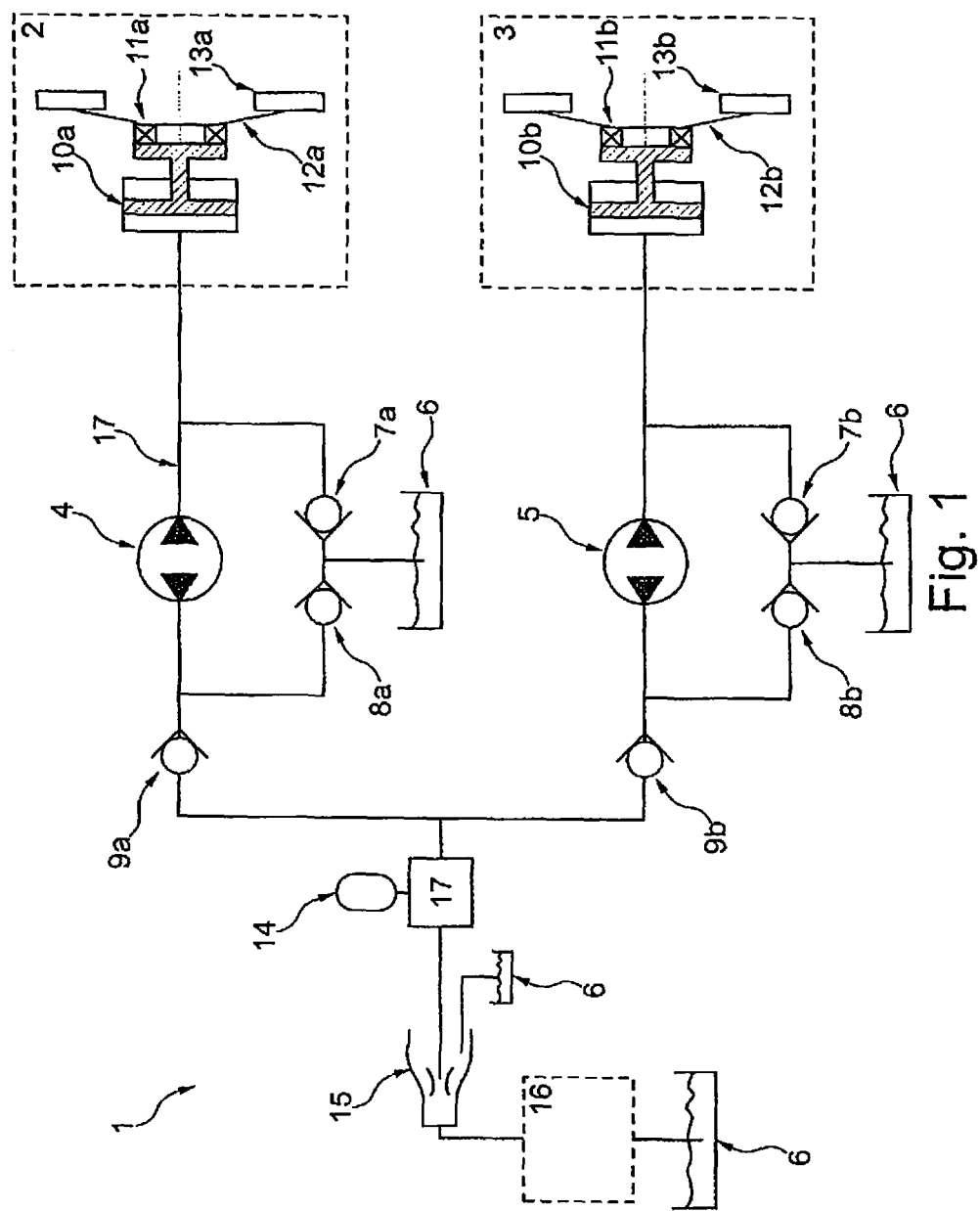
FIG. 1 a fluid circuit diagram of a fluid arrangement according to a first exemplary embodiment.
Figure 2:
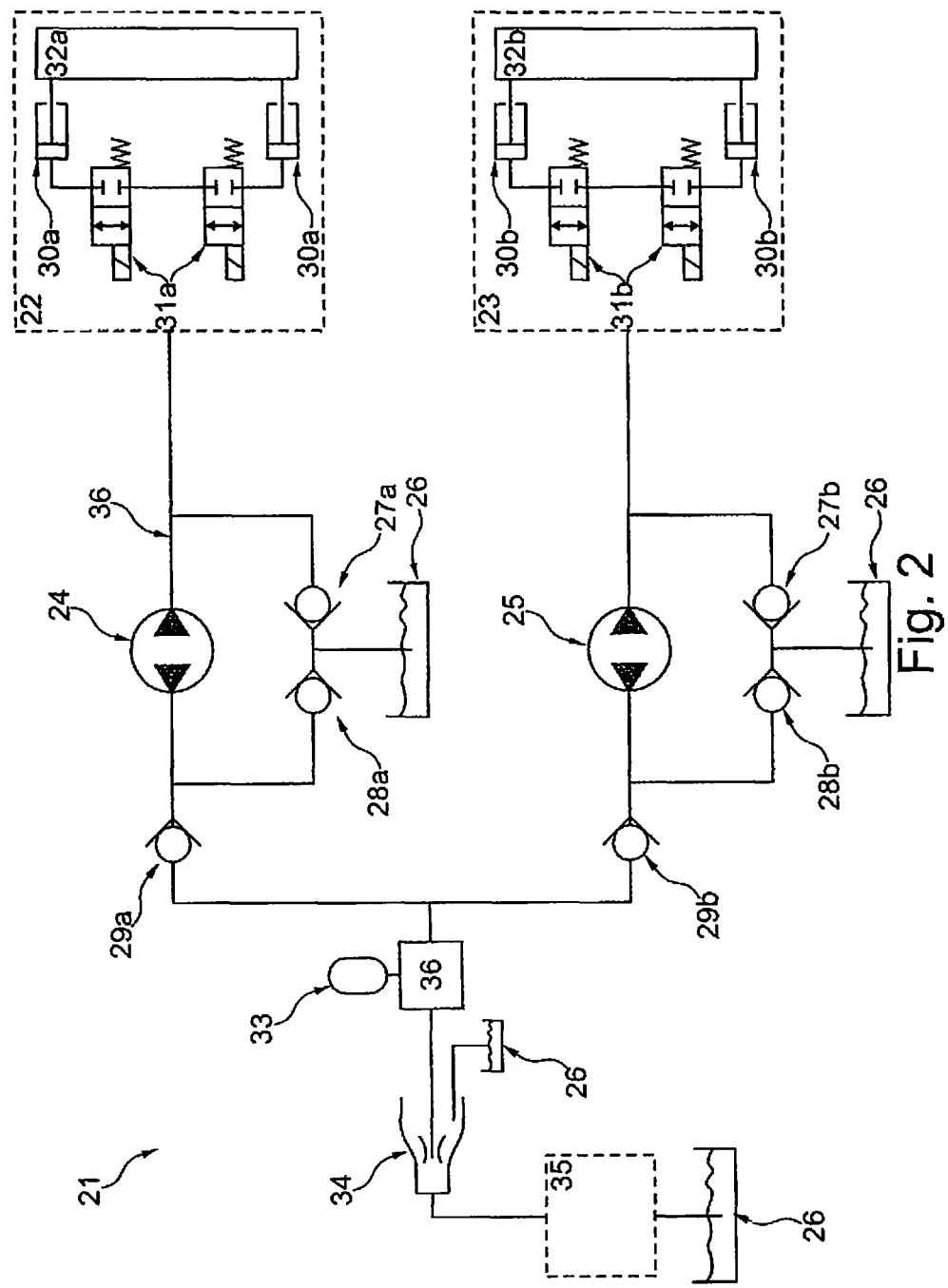
FIG. 2 a fluid arrangement similar to that in FIG. 1 according to a second exemplary embodiment.

FIGS. 1 and 2 illustrate two exemplary embodiments 1; 21 of a fluid arrangement according to the present invention, in the form of fluid circuit diagrams. Each fluid arrangement 1; 21 is located in a drive train (not shown) of a motor vehicle. In the drive train, the fluid arrangement 1; 21 serves to actuate a first motor vehicle component 2; 22 and/or a second motor vehicle component 3; 23. The actuating energy, which triggers an actuating process, is provided with the help of fluid pumps 4, 5; 24, 25.

The fluid pumps 4, 5; 24, 25 are designed as hydraulic pumps, in particular as positive displacement pumps. In a transporting mode, the hydraulic pumps 4, 5; 24, 25 draw hydraulic medium from a hydraulic medium reservoir 6; 26, also referred to as a fluid reservoir.

According to an essential aspect of the present invention, the fluid pumps 4, 5; 24, 25 are designed as so-called reversing pumps, which are able to operate in opposite transport directions, as indicated by arrow symbols.

The right side in FIGS. 1 and 2, with the symbolically indicated motor vehicle components 2, 3; 22, 23, is referred to as the clutch or transmission side, depending on the design of the motor vehicle components. The side located to the left of the fluid pumps 4, 5; 24, 25 in FIGS. 1 and 2 is also referred to as the cooling side.

Because of their design as reversing pumps, the fluid pumps 4, 5; 24, 25 are able to transport fluid from the fluid reservoir 6 either to the clutch side or transmission side or to the cooling side. To reverse the transport direction, for example, a direction of rotation of a rotating displacement body of the fluid pump 4, 5; 24, 25 is reversed.

According to an essential aspect of the present invention, the fluid pumps 4, 5; 24, 25 are used both to actuate the motor vehicle components 2, 3; 22, 23 and to cool the named motor vehicle components. A separate cooling oil pump can be omitted advantageously. According to another aspect of the present invention, a stream of cooling fluid provided by the fluid pumps 4, 5; 24, 25 can be fully regulated with the exception of a brief overlap phase, and therefore can be kept optimal with regard to energy.

In order to make possible the dual function of the fluid pumps 4, 5; 24, 25 according to the present invention, valves 7, 8, and 9; 27, 28, and 29 are provided. The valves assigned to the fluid pump 4 are designated 7a, 8a, and 9a. The valves assigned to the fluid pump 5 are designated 7b, 8b, and 9b. The valves assigned to the fluid pump 24 are designated 27a, 28a, and 29a. The valves assigned to the fluid pump 25 are designated 27b, 28b, and 29b.

The valves 9; 29 are positioned on the cooling side. Also positioned on the cooling side are an optional pressure accumulator 14; 33 and an auxiliary pump 15; 34. A rectangle 16; 35 on the cooling side indicates the two motor vehicle components 2, 3; 22,23 which are cooled with the help of the fluid pumps 4,5; 24,25. The corresponding fluid stream is conducted back to the fluid reservoir 6; 26. The operation of the pressure accumulator 14; 33 is optimized by a prioritizing logic unit 17; 36, likewise optional.

The motor vehicle components 2, 3 depicted in FIG. 1 are indexing clutches of a dual clutch. The indexing clutches 2, 3 are actuated by a respective slave cylinder 10a, 10b, which is connected to an output of the fluid pump 4, 5. An actuation system 11a, 11b includes, for example, an actuation bearing (not designated in further detail) and a pressure cup 12a, 12b, by means of which an actuating force is applied to a clamping plate 13a, 13b.

The motor vehicle components 2, 3 depicted by dashed rectangles, are to be understood as a black box. The black box can contain any desired type of clutch with hydraulic actuation.

The indexing clutches 2, 3 can be stacked radially or axially. In the depicted exemplary embodiment, power is introduced into the indexing clutches 2, 3 by means of separate slave cylinders 10a, 10b in combination with actuation bearings of actuation system 11a, 11b. However, other actuators can also be used within the framework of the present invention to actuate the indexing clutches 2, 3, for example levers.

Each indexing clutch 2, 3 is actuated by means of the reversing pump 4, 5 connected to it. The fluid pumps or reversing pumps 4, 5 are connected to the reservoir 6 on the clutch side by means of the valves 7a, 7b, and on the cooling side by means of the valves 8a, 8b. In this case, the valves 7, 8 are designed as check valves. The result is that it is ensured in a simple manner that pressure is built up in both transport directions of the fluid pumps 4, 5, and fluid from the reservoir 6 can be drawn along.

When the fluid pumps 4, 5 in FIG. 1 are transporting to the right, i.e., to the clutch side, then the indexing clutches 2,3 are actuated. When the fluid pumps 4, 5 in FIG. 1 are transporting to the left, i.e., to the cooling side, then a stream of cooling fluid is transported to the cooling side. In practical terms, the fluid pump 4 or 5 is used to actuate the respective indexing clutch 2, 3, while the other fluid pump 5, 4 is used to provide a stream of cooling fluid. Of course, if neither of the two indexing clutches 2, 3 is being actuated, then both fluid pumps 4, 5 can also be used for cooling.

The stream of cooling fluid or cooling oil from the fluid pumps 4, 5 is brought together by means of the valves 9a and 9b, which are likewise designed as check valves. The check valves 9a, 9b prevent fluid from being transported from the one pump 4, 5 to the other pump 5, 4 in certain operating conditions, without a stream of cooling fluid being produced.

The optional pressure accumulator 17 serves to bridge over an unwanted undersupply of cooling oil. Such an undersupply could occur in overlap phases, when both fluid pumps 4, 5 are being used to actuate the respective indexing clutch 2, 3. The prioritizing logic unit 17 serves advantageously to drain or fill the pressure accumulator 14 at the correct time. The prioritizing logic unit 17 can include an active or a passive valve. The prioritizing logic unit can also be designed as a throttle.

The auxiliary pump 15 is advantageously designed as an ejector pump, and serves to increase the stream of cooling fluid provided by the fluid pumps 4, 5 and to lower its pressure.

The cooling side in FIG. 2 is designed exactly the same as the cooling side in FIG. 1. The connection of the fluid pumps 24, 25 to the valves 27a, 28a, and to the valves 27b, 28b and the fluid reservoir 26 in FIG. 2 is likewise performed exactly as in FIG. 1. To avoid repetition, reference is made in this respect to the earlier functional description of the cooling side as described in connection with FIG. 1. The following section will explain primarily the differences between the fluid arrangements 1 and 21 depicted in FIGS. 1 and 2.

In FIG. 2, the motor vehicle components 22 and 23 are transmission components. In FIG. 2 indexing transmissions 32a and 32b are indicated by rectangles. The indexing transmissions 32a, 32b are actuated by means of slave pistons 30a, 30b, ahead of which valves 31a, 31b are respectively connected. The valves 31a, 31b are designed as electromechanically actuated 2/2 directional valves. The fluid pumps 24, 25 provide a desired pressure or a desired actuating volume for shifting gears and/or for selecting gears of the indexing transmissions 32a, 32b.

Figure 3:
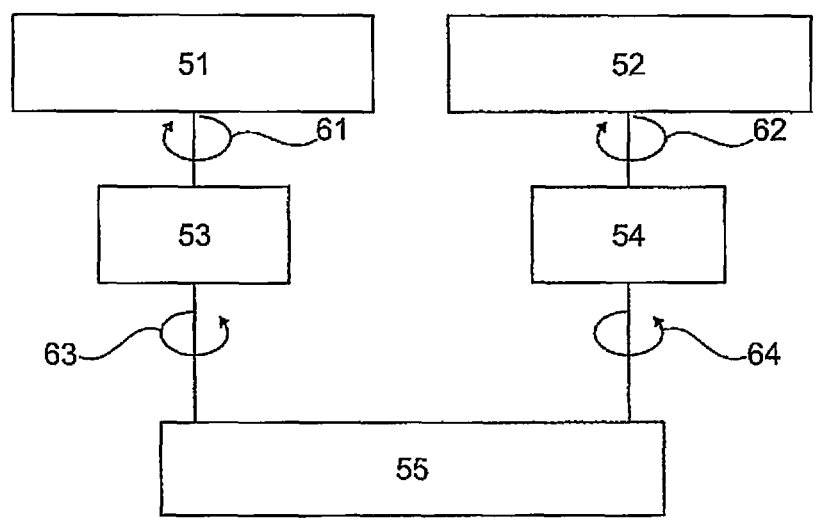
FIG. 3 a greatly simplified depiction of the fluid arrangement according to the present invention.

FIG. 3 illustrates the principle of the fluid arrangements 1, 21 according to the present invention as shown in FIGS. 1 and 2, and in a greatly simplified form. Two indexing clutches of a dual clutch are indicated by rectangles 51, 52. Rectangles 53 and 54 represent two fluid pumps which, as reversing pumps, can transport fluid in opposite transport directions. A cooling system for the dual clutch having the indexing clutches 51, 52 is represented by the rectangle 55.

Arrows 61, 62 indicate first transport directions, or directions of rotation, of the fluid pumps 53, 54, in which the fluid pumps 53, 54 are used to actuate the indexing clutches 51, 52. Additional arrows 63, 64 indicate opposite or second transport directions, or directions of rotation, of the fluid pumps 53, 54, in which the fluid pumps 53, 54 provide a stream of cooling fluid for the cooling system 55.

Figure 4:
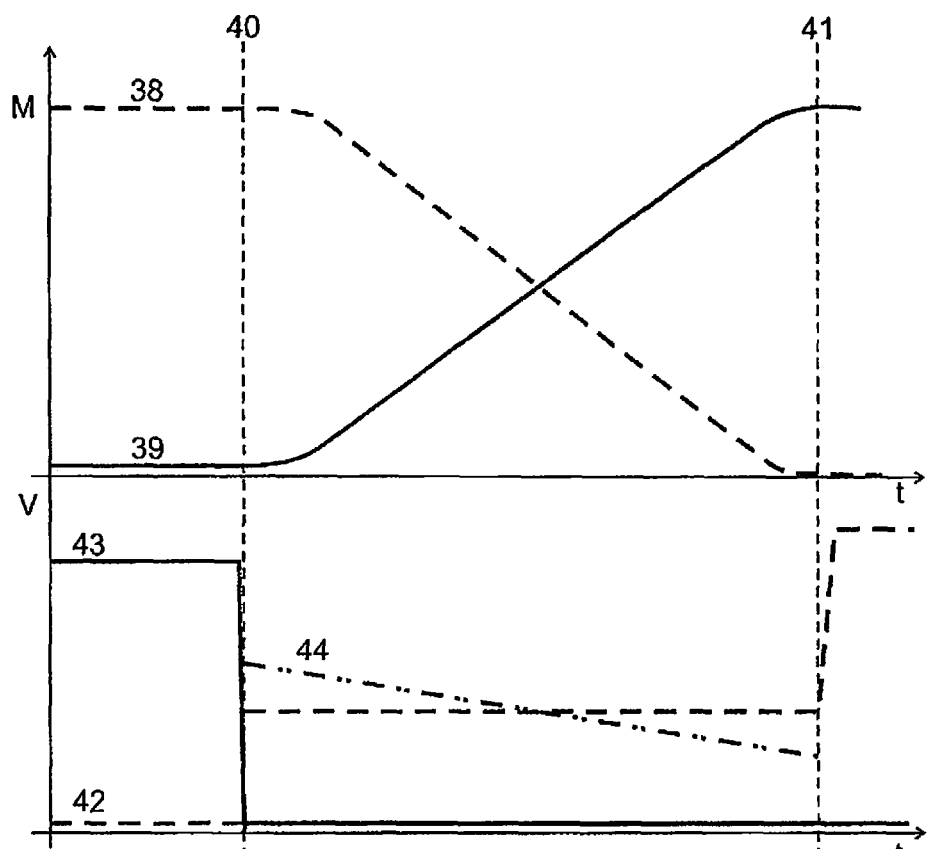
FIG. 4 two Cartesian coordinate graphs positioned one above the other, in which the pattern of a cooling volume flow in an overlap phase is illustrated.

FIG. 4 shows two Cartesian coordinate graphs, which are positioned one above the other. On the x axes of each of the two coordinate graphs the time t is plotted in an appropriate time unit. On the y axis of the upper coordinate graph in FIG. 4, the output torque of the indexing clutches (for example clutches 51, 52 in FIG. 3) is plotted in an appropriate unit. On the y axis of the lower coordinate graph in FIG. 4, a cooling volume flow is plotted in an appropriate unit.

A dashed line 38 represents the pattern of the output torque of the first indexing clutch 51 over time. A solid line 39 represents the pattern of the output torque of the second indexing clutch 52 over time. A dashed line 42 represents the flow of cooling fluid of the first pump 53 over time. A solid line 43 represents the pattern of the flow of cooling fluid of the second fluid pump 54 over time. A dash-dotted line 44 represents the pattern of a flow volume over time provided from the pressure accumulator 17 shown in FIG. 1.

FIG. 4 shows how the flow of cooling fluid can be kept nearly constant in an overlap phase through use of flow from the pressure accumulator. At the beginning, the vehicle is driven only by the first indexing clutch 51, as represented by the dashed line 38. The second indexing clutch 52 is disengaged, as represented by the solid line 39. The flow volume needed for cooling is provided by the second pump 54, as represented by the solid line 43, and can also be freely regulated.

The time of overlap begins at a time 40 and ends at a time 41. Starting from time 40, the second pump 54 is needed in order to engage the second clutch 52. The second pump 54 therefore can no longer provide any flow of cooling fluid. The first clutch 51 is disengaged. At the same time, the first pump 53 automatically transports fluid in the cooling direction of reeling.

The flow volume is a byproduct of the overlap, however, and therefore cannot be regulated from the perspective of cooling. If the flow volume is too small, then the pressure accumulator 17 shown in FIG. 1 drains automatically and adds fluid to it, as indicated by the line 44. As of time 41, the overlap is ended, and the vehicle is driven only by the second indexing clutch 52. The first pump 53 is then available for cooling and can be fully regulated. In that state, the pressure accumulator 17 shown in FIG. 1 can be filled again.

The invention claimed is:

1. A fluid arrangement for fluid actuation of at least one motor vehicle drive train component, the fluid arrangement comprising:
   at least one fluid actuation system including a fluid energy source,
   wherein the fluid energy source includes two fluid pumps each having a first fluid transport direction and having a second fluid transport direction opposite the first fluid transport direction,
   wherein the fluid pumps are operable in a first operating mode to provide fluid actuation of the motor vehicle drive train component and are also operable in a second operating mode to provide a stream of fluid to cool the motor vehicle drive train component, and wherein the fluid pumps are each connected to a fluid reservoir by a respective first valve on a pump input side and a respective second valve on a pump output side.

2. The fluid arrangement according to claim 1, including an auxiliary fluid pump connected to a cooling flow side of each of the fluid pumps.

3. The fluid arrangement according to claim 2, wherein a pressure accumulator is connected on the cooling flow side of the fluid pumps to provide supplemental flow of cooling fluid during periods of low cooling flow volume from the fluid pumps.

4. A The fluid arrangement according to claim 3, including a respective flow control valve connected between each fluid pump and the pressure accumulator.

5. The fluid arrangement according to claim 4, wherein the flow control valves are check valves.

6. A The fluid arrangement according to claim 3, including a prioritizing fluid logic unit upstream of the auxiliary fluid pump and operatively connected to the pressure accumulator.

7. The fluid arrangement according to claim 2, including a respective valve connected between each fluid pump and the auxiliary fluid pump.

8. The fluid arrangement according to claim 2, wherein the auxiliary fluid pump is an ejector pump.

9. A method for fluid actuation of at least one motor vehicle drive train component by a fluid arrangement, the method comprising:
operating two fluid pumps to selectively actuate the at least one motor vehicle drive train component and to cool at least one other motor vehicle component,
wherein each fluid pump is operable in a first fluid transport direction and a second fluid transport direction, and
wherein the fluid pumps are each connected to a fluid reservoir by a respective first valve on a pump input side and a respective second valve on a pump output side.

10. The method of claim 9, further comprising:
providing supplemental flow of cooling fluid, via a pressure accumulator connected on a cooling flow side of the fluid pumps, during periods of low cooling flow from the fluid pumps.

11. The method of claim 10, wherein a respective flow control valve is connected between each fluid pump and the pressure accumulator.

12. The method of claim 11, wherein the flow control valves are check valves.

13. The method of claim 9, wherein a respective valve is connected between each fluid pump and an auxiliary pump.

14. A fluid arrangement for fluid actuation of at least one motor vehicle drive train component, the fluid arrangement comprising:
at least one fluid actuation system including two fluid pumps each having a first fluid transport direction and a second fluid transport direction opposite the first fluid transport direction, wherein the fluid pumps are operable in a first operating mode to provide fluid actuation of the motor vehicle drive train component and are also operable in a second operating mode to provide a stream of fluid to cool the motor vehicle drive train component;
a pressure accumulator connected on a cooling flow side of the fluid pumps to provide supplemental flow of cooling fluid during periods of low cooling flow volume from the fluid pumps; and
a respective flow control valve connected between each fluid pump and the pressure accumulator.

15. The fluid arrangement of claim 14, wherein the fluid pumps are each connected to a fluid reservoir by a respective first valve on a pump input side and a respective second valve on a pump output side.

16. The fluid arrangement of claim 14, further comprising:
an auxiliary fluid pump connected to the cooling flow side of each of the fluid pumps.

17. The fluid arrangement of claim 16, further comprising:
a respective valve connected between each fluid pump and the auxiliary fluid pump.

* * * * *